Jan. 21, 1969     F. D. BERKELEY III     3,422,887
CONDENSER FOR DISTILLATION COLUMN
Filed June 19, 1967     Sheet _1_ of 2
FIG. 1.
FIG. 2.
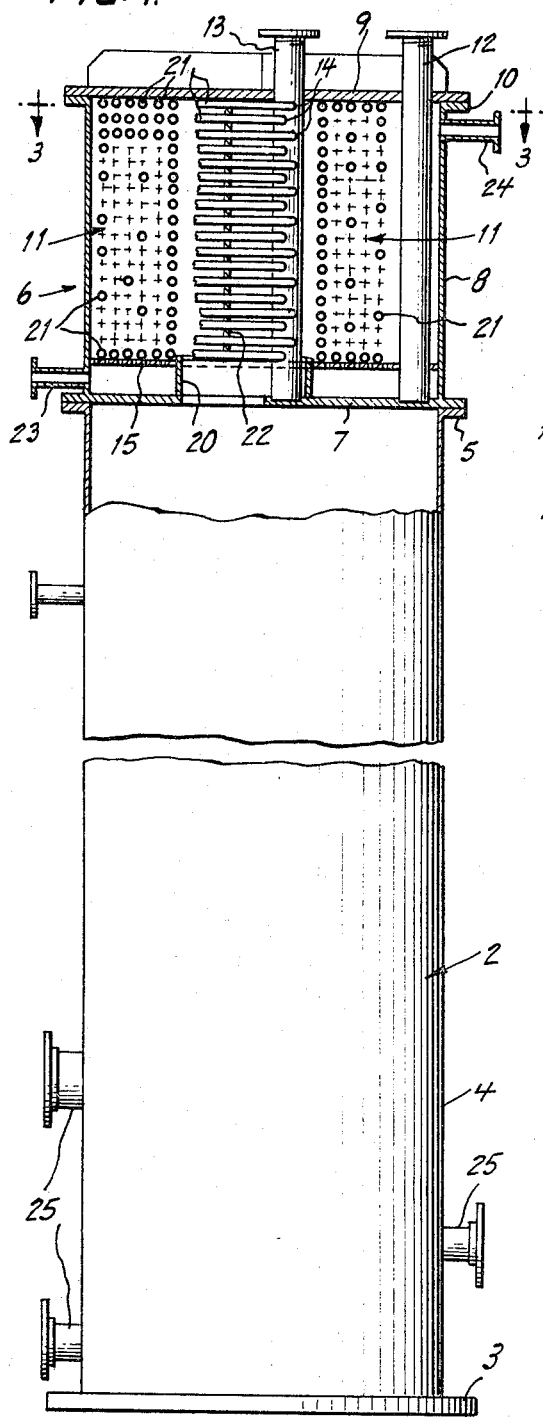
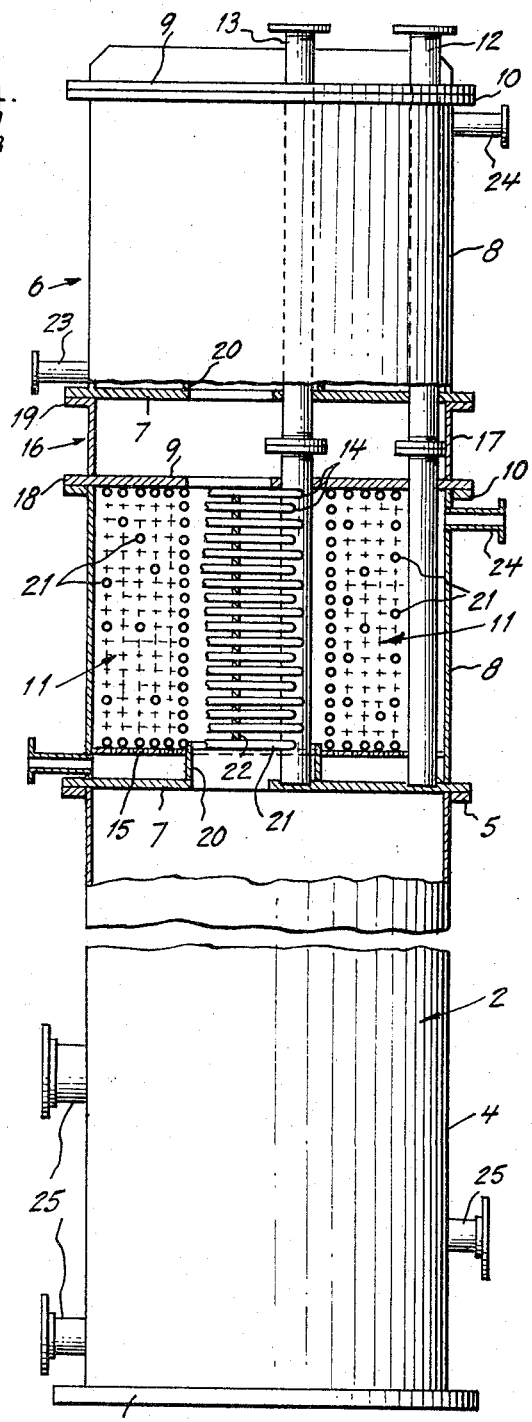
INVENTOR
FREDERICK D. BERKELEY III
BY
Roland J. Booth
ATTORNEY 3,422,887
CONDENSER FOR DISTILLATION COLUMN
Frederick D. Berkeley III, Rochester, N.Y., assignor to
Graham Manufacturing Co., Inc., Batavia, N.Y., a
corporation of New York
Filed June 19, 1967, Ser. No. 646,817
U.S. Cl. 165—113                                3 Claims
Int. Cl. B01d 5/00; F28b 1/02

ABSTRACT OF THE DISCLOSURE

A condenser is removably mountable on a distillation or stripping column. The condenser is compact and easily cleaned due to a removable spiral tube bundle.

---

This invention relates to improvements in heat exchangers and is a modification of and an improvement on the construction shown in Patent No. 2,578,059 issued Dec. 11, 1951.

The invention provides improvements in a heat exchanger having a plurality of tubes, each formed into a spiral shape and arranged in superimposed spaced relation with opposite ends of the tubes secured to inlet and outlet manifolds for the circulation of cooling fluid through the manifolds and tubes for condensing water vapors, such as steam and other condensible vapors.

The invention provides a vertical column type vapor condenser suitable for installation on a cylindrical vertical distillation column mounted on the base with the vapor condenser unit mounted on top of the distillation column having an outer cylindrical casing with top and bottom walls, inlet and outlet manifolds extending between the top and bottom walls, having a plurality of spiral conduits mounted in superimposed relation between spacer bars and filling said casing between the top and bottom walls with opposite ends of each conduit connected to each of the manifolds for circulating cooling fluid between said manifolds for condensing steam and other condensible vapors.

The invention provides a vapor condenser having a cylindrical casing filled with a tube bundle between top, and bottom walls on opposite ends of the casing having the tube bundle formed of a plurality of spiral tubes arranged in superimposed relation spaced apart by spacer bars, the tubes having opposite ends attached to manifolds extending between the top and bottom walls of said casing for circulation of cooling fluid through the tube bundle and tubes for condensing the steam and other vapors in the casing so the condensate will drip or flow and collect in the bottom of the casing for removal through a suitable condensate outlet, with the casing mounted on top of a cylindrical column to form a compact construction that will not require an extra supporting structure so the condenser structure may be easily assembled and installed at the location where it is to be used.

The invention also provides a vapor condenser having a cylindrical casing closed by top and bottom plates, having a perforated plate mounted within the casing in spaced parallel relation to and a short distance above the bottom plate to form a sub-cooling section, the casing having a tube bundle supported on the perforated plate formed of a plurality of spirally shaped tubes mounted in adjacent relation one above the other and spaced apart in the bundle by a plurality of spacer bars, the tubes having opposite ends secured to and communicating with manifolds extending between the top and bottom plates and formed to provide an inlet and outlet for the cooling fluid used in condensing vapors such as steam, the sub-cooling section being filled with spiral tubes mounted in tangent relation on top of one another with opposite ends also connected to the manifolds for circulation of cooling fluid therethrough and the spiral tubes forming a spiral passage for the condensate to flow through to a condensate outlet at the bottom of the casing opening into the sub-cooling section. The sub-cooling section serves to further cool and reduce the condensate temperature below the condensing temperature.

The invention further provides a condenser for steam and other condensible vapors, having a vertical cylindrical casing with top and bottom walls mounted on the upper and lower ends of the casing with a tube bundle substantially filling the casing between the top and bottom walls, the tube bundle being formed of a plurality of spiral tubes mounted in superimposed relation and spaced apart by substantially radially extending spacer bars to provide for free vapor flow between and around the tubes in the bundle throughout the casing, opposite ends of each tube being secured to one of and communicating with a manifold, two manifolds being provided and extending through the casing between the upper and lower end walls with suitable inlet and outlet connections attached to opposite ends of each manifold for circulation of cooling fluid, a spiral baffle extending between the upper and lower end walls and a selected portion of the spiral tubes forming the tube bundle for directing the non-condensible vapors parallel to the tubes so as to cool these non-condensible vapors prior to being discharged through a non-condensible vapor outlet.

The invention provides a vapor condenser having a vertical cylindrical outer casing closed by top and bottom walls at opposite ends, a perforated partition wall mounted in spaced relation in said casing above the bottom wall, a tube bundle filling said outer casing between the perforated partition wall and top wall having a plurality of condensing tubes formed into spiral shape and mounted one above the other with spacer bars extending between adjacent tubes in substantially radial relation, a pair of manifold pipes extending between the top and bottom walls of said casing and having opposite ends of each tube connected with one of the manifold pipes for circulation of cooling fluid through the tubes in the tube bundle for condensing steam and other condensible vapors circulating between the tubes in the tube bundle so the condensate will drip down about the tubes and flow through the perforated partition wall into the bottom of the casing for flow outwardly through a condensate outlet, while inlet and outlet connections are provided with said manifold pipes for the circulation of cooling fluid being liquid, gas, vapor or any mixture of these fluids into and out of the manifold pipes and tube bundle during the condensing operation, the bottom wall of the casing having a large opening in the center with a pipe section mounted on the inside of the opening in the bottom wall extending upwardly in the casing through the perforated partition so vapors discharged into the pipe section will flow into the center of the tube bundle above the perforated partition for circulation through the tube bundle so the condensible vapors will be condensed on the tubes in the bundle and flow into the bottom of the casing and outwardly through the condensate outlet. The bottom of the casing forms a condensate reservoir for accumulating condensate therein for subsequent withdrawal through the condensate outlet. An outlet is provided at the top of the casing for withdrawal of non-condensible vapors.

The invention provides a heat exchanger having a vertical cylindrical casing provided with top and bottom walls on opposite ends of the cylindrical casing with a tube bundle substantially filling the casing formed of a plurality of spirally formed tubes mounted in superimposed relation and spaced apart by spacer bars between adjacent tubes, manifolds providing a connection with the ends of the tubes to facilitate circulation of cooling fluid through the tube bundle, suitable inlet and outlet connections providing for the supply and circulation of condensible vapors through the tube bundle, the construction of the condenser being such that two or more casings may be mounted on top of each other and operated in conjunction with each other, and one of the condenser units being adapted for mounting and operation on top of a stripping or distillation column having a cylindrical casing approximately the same size as the cylindrical casing of the condenser unit and having equipment mounted in the column for performing a desired type of stripping or distilling operation followed by use of the condenser for condensing the condensible vapors from the stripping or distillation column on which it is mounted.

The invention provides a condenser construction having an outer cylindrical casing closed by top and bottom walls with inlet and outlet connections for the circulation of cooling fluid into and out of a bundle of condenser tubes substantially filling the casing for condensing condensible vapors circulated through an inlet into the casing with a condensate outlet for draining off the condensate, the invention providing a construction in which two or more condensers may be mounted on top of one another to form a condenser column for joint operation in condensing condensible vapors from various sources.

The invention further provides a vapor condenser having a tube bundle formed of a plurality of spiral tubes spaced apart by spacer bars in which the coiled construction provides a natural spring action which eliminates stresses in the tubes due to thermal expansion since no expansion joints are provided and there are no packed joints that may leak. The tube bundle is easily removed for cleaning, inspection or replacement. A spiral baffle is mounted over a section of the tubes in the bundle to shroud the coldest sections of the tubes to provide a positive means of cooling the non-condensible vapors to a temperature nearest that of the cooling fluid in the condenser tubes at the inlet into the condenser. The construction of the tube bundle provides for radial flow of the vapors through the tube bundle in order to obtain condensation of the vapors with a relatively low pressure drop across the tubes. The tubes in tube bundle may be provided with fins for increasing the heat transfer surface to increase the rate of condensation of condensible vapors. The spacing arrangement of the spiral tubes in the tube bundle provides for a spiral flow of fluid in the tube bundle to promote turbulence of the fluid in the tube bundle to promote the transfer of heat and increased efficiency in operation of the condenser. The number of welded joints are kept to a minimum for keeping the cost of construction to a minimum while providing a compact construction. The compact construction of the tube bundle reflects the efficiency of the heat transfer of the condenser and provides a unique tubular spiral design adapted to have the heat transfer surface varied for use as stripping column condensers, distillation column condensers, recovery condensers, partial condensers, refluxing condensers, exhaust heat recovery condensers and ejector inter and after condensers.

Other features and advantages of the invention will become apparent from the illustration in the drawings and the following description and claims directed to the preferred construction.

In the drawings:

FIG. 1 shows a distillation column in side elevation with a condenser unit mounted on top of the column shown in cross section to illustrate details of construction.

FIG. 2 shows a distillation column in side elevation with two vapor condenser units mounted on top of one another on top of the column, one of the condenser units being shown in cross section to illustrate details of construction.

Figure 3:
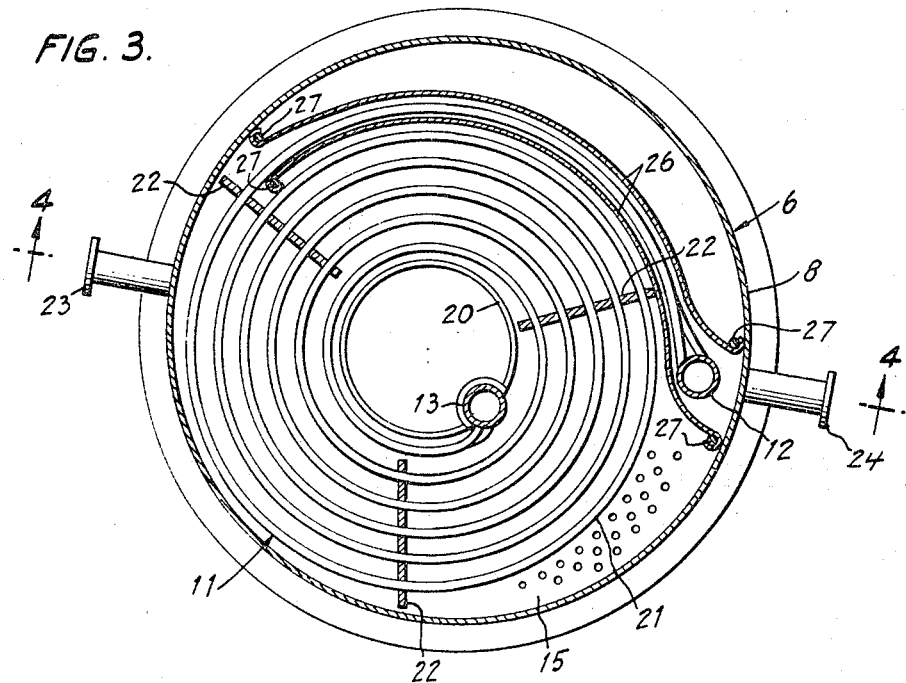
FIG. 3 is a horizontal cross section taken approximately on the line 3—3 of FIG. 1.

The invention provides one or more condenser units 6 see FIGS. 1 and 2 constructed for mounting in superimposed relation on top of one another as shown in FIG. 2. The illustration in FIG. 1 shows one vapor condenser unit 6 mounted on top of a cylindrical column 2 which may be used as a distillation or stripping column. The column 2 will contain conventional stripping or distillation equipment, not illustrated, for performing a well known form of conventional stripping operation for separating a condensible liquid from a fractional liquid composition. In a stripping operation, a liquid is usually fed into trays in the column where the liquid in the trays is heated to evaporate a fraction of the liquid composition to be separated. The evaporated liquid composition is then fed into the condenser 6 on top of the column 2 where the vapor is condensed into liquid and removed through the condenser condensate outlet. Where the column is used for distillation purposes, a liquid, such as oil, salt water, and other composition liquids may be heated in trays or by other means to vaporize the liquid so the vapor may be condensed to separate a desired fraction from a combined fluid composed of fluids that may be separated by heating and vaporization.

The cylindrical column 2 has a base plate 3, as shown in both FIGS. 1 and 2. The cylindrical column 2, FIGS. 1 and 2, has a cylindrical casing 4 formed of a metal plate or other material mounted at the lower end on the base plate 3 in vertically extending relation and secured thereto by welding or the like. The cylindrical casing 4 forming the column 2 has a radially extending flange 5, FIGS. 1 and 2, mounted on the upper end of the cylindrical casing 4 preferably by welding. The radial flange 5 and the cylindrical column 2 and base plate 3 provide a support for one or more condenser units 6. Each condenser unit 6 has a base plate 7 formed of a plate of sheet metal or other material mounted on the upper end of the cylindrical casing 4 with the outer marginal portion seated on and attached to the radial flange 5 by any conventional means such as welding.

Each condenser unit 6 has an outer hollow cylindrical casing 8 mounted on the baseplate 7 in vertically extending relation with the bottom edge welded or bonded thereto in fluid tight relation. The cylindrical casing 8 may be made of sheet metal or other material found suitable for the purpose. A top plate 9 of conventional form having a transverse rib projecting upwardly is mounted on the upper end of the casing 8 and detachably secured to the ring 10 in fluid tight relations. The cylindrical casing 8 has the outer portion of the base plate 7 extending over and secured by welding or the like to the radial flange 10 on the upper end of the adjacent cylindrical casing 8 by welding or the like on which it is supported.

A tube bundle 11 is removably mounted in the hollow casing 8 between the base plate 7 with its manifolds 12 and 13 and the top plate 9 to completely fill the casing between the top and base plates. An inlet manifold 12 is formed by a length of pipe or hollow barstock extending vertically through the inside of the cylindrical casing 8 between the base plate 7 and the top plate 9 with the upper end of the manifold extending through an opening in fluid tight relation and terminating a short distance above the top plate 9 and provided at the upper end with a radial flange formed to have a pipe attached thereto to conduct cooling fluid into the inlet manifold 12. The lower end of the pipe forming the inlet manifold 12 is engaged with the upper face of the base plate 7 which is constructed to retain the manifold against sidewise movement to base plate 7. The inlet manifold 12 is located adjacent to the inner wall of the cylindrical casing 8. An outlet manifold 13 is mounted in the central portion of the casing 8, has the lower end extending to the base plate 7 with the upper end extending in fluid tight relation through an opening in the top plate 9 and provided at the upper end with an annular radially extending flange for attachment of pipes for circulation of cooling fluid outwardly from the casing and tube bundle. It will be understood that where desired the manifolds 12 and 13 may be formed to extend to and terminate at the inner surface of the base plate 7.

Each of the manifolds 12 and 13 is formed with a plurality of apertures 14 in the portions extending between the base plate 7 and top plate 9. The apertures are formed in aligned relation between the base plate 7 and the top plate 9 in two spaced apart groups.

Each condenser unit 6 has a perforated supporting plate 15 formed of any suitable material having a size to fit across the bottom portion in the cylindrical casing 8 in spaced relation above the base plate 7 for supporting the tube bundle 11 with the condenser tube at the bottom of the bundle resting on and supported by the perforated plate 15.

Where it is desired to mount two or more condenser units 6 on top of one another, or on top of a column, the units are built so the inlet and outlet manifolds 12 and 13 extend below the base plate 7 in fluid tight relation and above the top plate 9 in fluid tight relation a distance sufficient for the manifold end flanges to set on one another so they may be secured together and the joint between the flanged ends sealed against leakage by a suitable gasket. As shown in FIG. 2, where two units are mounted one above the other on the top of a column 2, a filler spacer section 16 is mounted on top of the lower condenser unit 6. The filler spacer section 16 has a cylindrical casing portion 17 having the lower edge seated on a bottom plate 18 in inwardly spaced relation from the outer edge and welded thereto in fluid tight relation. The outer marginal portion of the bottom plate 18 seats on and is secured to the flange 10 on the upper end of the cylindrical casing 8 in fluid tight relation in any conventional manner well known in the art. The flange 10 is formed by welding an annular flat sheet metal ring to the upper edge of the cylindrical casing 8 in radially extending relation. The bottom plate 18 sets on top of and has the outer marginal portion attached by welding or the like to the outer marginal portion of the top plate 9 of the lower condenser unit 6. The radial flange 19 on the upper end of the casing portion 17 of the filler spacer section 16 is attached to the outer marginal portion of the base plate 7 of the condenser unit 6 mounted above the condenser unit 6 below as shown in FIG. 2 engaged thereon and secured thereto by welding or the like to attach the two condenser units together in assembled fluid tight relation. The marginal portions of the base plate 7 of the upper and lower condenser units 6 set on the upper surfaces of the flanges 19 and 5, respectively, on the upper ends of the casing portion 17 of the filler spacer section 16 and the upper end of the column 2, respectively, and is rigidly secured thereto by welding or the like for attaching the condenser units together in assembled fluid tight relation on top of one another and on top of the column 2 and the filler spacer section 16 used between the condenser units 6 mounted above one another on top of the column 2.

The base plate 7 and the perforated plate 15 are each formed with an opening in the central portion with a short length of pipe 20 secured to the base plate 7 about the opening at the lower end and the upper end extending through the opening in and secured to the perforated plate 15 about the opening therein. The lower end of the pipe 20 and the opening in the base plate 7 communicate with the interior of the casing 4 of the column 2 so vapors may flow from the column 2 into the lower end of the condenser 6 mounted on the upper end of the column 2 for condensing the condensible portions of the vapors on the tube bundle 11. Where it is not desired or necessary to extend the lower ends of the manifolds 12 and 13 below the base plate 7 of the condenser unit 6 in which they are used, it will be understood that the lower end of each of the manifolds 12 and 13 may be closed in any desired manner, such as by threading or welding a cap on the lower end of the manifold in liquid tight relation, not shown, or by sealing the lower end in any suitable manner, well known in the art, to the base plate 7 to prevent leakage.

The tube bundle 11 is formed of a plurality of condenser tubes 21 shown diagrammatically in the drawings. Each condenser tube 21 is formed into a spiral shape as shown in FIG. 3, and arranged one above the other in symmetrical relation in the tube bundle. Each condenser tube 21 has the end portions formed so that they will extend into one of the apertures in the manifolds 12 and 13 and be rigidly secured to the manifold by soldering, welding, or other well known attaching means in fluid tight relation. The condenser tubes 21 have strips 22 extending transversely or radially between adjacent tubes 21, see FIG. 3, to hold them apart in spaced relation between opposite ends so vapor may circulate freely between and around the tubes from the central portion of the tube bundle to the outer portions thereof.

Figure 4:
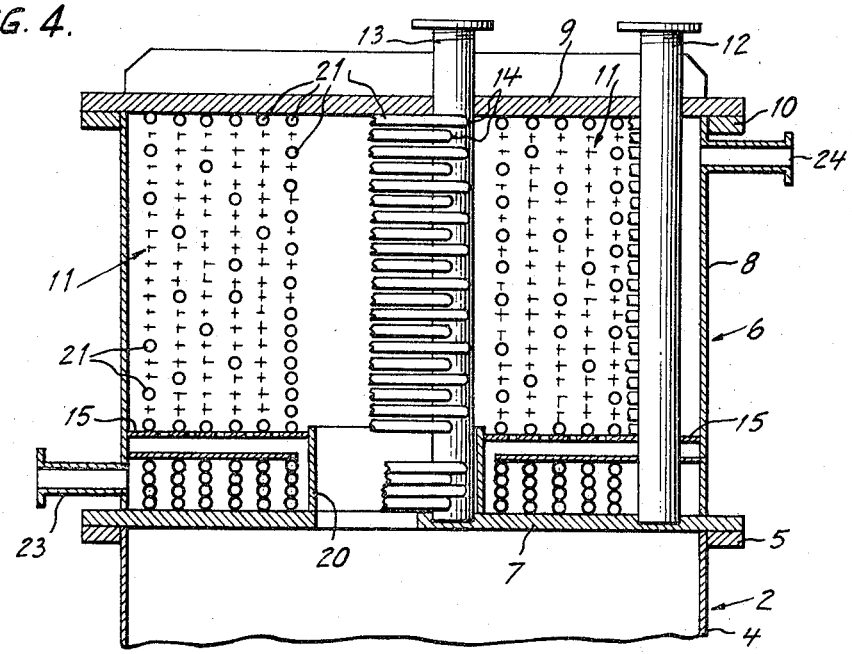
FIG. 4 is a vertical cross section taken approximately along the line 4—4 of FIG. 3 showing details of construction of a condenser unit with a sub-cooling section added.

The ends of the condenser tubes 21 are inserted into the openings in the manifolds 12 and 13 and will be spaced apart sufficiently so they may be readily engaged and secured to the manifold without interfering with one another and so vapors may freely circulate about the tubes. The condenser tube ends are inserted into adjacent holes in the manifolds starting at one end and progressing one hole at a time toward the outer end. The construction in FIG. 4 is such that the compartment formed between the base plate 7 and the perforated plate 15 will be completely filled with condenser tubes 21, mounted in contact with one another throughout the length of each tube between the manifolds to provide a spiral vapor passage extending from the central portion of the casing to the outer portion thereof. In both FIGS. 3 and 4 the tubes 21 in the compartment between the top plate 9 and the perforated plate 15 are cooled for condensing the condensible portions of the vapors. The condensate collects in the bottom of the casing 8 above the base plate 7 and is withdrawn from the condenser 6 through the condensate outlet 23 attached to the lower end of the casing 8 and suitable pipe connections, not shown, for use of the condensate in any desired manner. The casing 8 has an outlet pipe 24 mounted at the upper end adjacent to radial flange 10 and communicating with the interior of the casing for flow of non-condensible vapors or gases from the casing 8 through suitable pipe connections, not shown, attached to the outlet pipe 24. The non-condensible vapors and gases may be discharged into the atmosphere or subjected to such further treatment as may be desired.

The casing 4 of the column 2 is provided with a plurality of pipe attaching fittings 25 for use in attaching pipes used for circulating fluids into and out of the casing 4 for treatment within the casing 4 in the predetermined manner, such as distillation of the fluid for separating portions of the fluid in a stripping operation as herein before mentioned.

A pair of curved baffle sections 26, FIG. 3 are mounted to extend between the outermost portions of the spiral condenser tubes 21 to partition off the outer ends of the condenser tubes 21 from the remaining tube portions in the bundle 11 for directing the non-condensible portions of the vapors over the coldest portions of the condenser tubes 21 in the tube bundle 11 for cooling the non-condensible vapors to the lowest possible temperature after which the non-condensible vapors are discharged through the non-condensible outlet 24. Opposite ends of the curved baffle sections 26 are attached to supporting bars 27 extending between the base plate 7 and the top plate 9. The curved baffle sections 26 extend between about one-third or more of the length of the outermost spiral coil portions of the condenser tubes 21, see FIG. 3.

The flanges mounted on the ends of the manifolds 12 and 13 are preferably removably mounted on the ends of the manifolds by being threaded thereon as indicated in the drawings but may be welded. The top plate 9 is preferably formed with openings through which the manifolds extend so that the tube bundle 11 may be easily inserted and removed from the top plate 9. The perforated partition 15 may be assembled with the tubes in the tube bundle 11 and be made removable therewith when the tube bundle is removed from the cylindrical casing 8.

It is preferable in carrying out the invention to make the spiral tubes 21 and the manifolds 12 and 13 first, also the perforated partition 15 and then assemble the tubes on the manifolds with the spacer bars mounted between the tubes until the tube bundle is complete. The base plate 7, top plate 9 and casing 8 and curved baffle sections 26, with its radial flanges and bars 27 should be made and assembled. Then the tube bundle with the manifolds 12 and 13 is inserted into the casing 8 after the base plate 7 has been mounted on the bottom end of the casing 8. The top plate 9 is then mounted on the upper end of the casing 8 and secured in position. The end flanges are then placed on the ends of the manifolds 12 and 13. The condenser is then assembled in position on the upper end of the column like the column 2 or on top of another condenser and the various pipe connections with the inlet and outlet fittings are completed so cooling water may be circulated through the condenser tubes for condensing the condensible portions of vapors circulated into the condenser casing 8 through the opening in the base plate 7. The fluid condensate is drained off through the condensate outlet 23. The column 2 and assembled condensers 6 are located where the assembly is to be used and then connected up for operation as above described.

Where the tube bundle 11 and the condenser 6 is large in size, more spacer bars 22, will be used than in units of smaller size. The number of spacer bars used will vary with the size of the tube bundle. The size of the square or rectangular spacer bars may be varied to suit the operation of the condenser.

The condenser provided by the construction herein described provides efficient substantially trouble free operation in condensing vapors. The present condenser is well adapted for condensing and separating a gas-vapor mixture and condensing pure condensible vapors.

The spiral condenser coil construction utilizes the natural spring action of the condenser tubes to substantially eliminate stresses in the tubes due to thermal expansion. There are no expansion joints or packed joints to leak.

The construction of the condenser disclosed herein is compact and well adapted for mounting on the top of a distillation column or stripping column to provide an integral unit without requiring extra supporting structure.

The spiral shape of the condenser tubes provides for radial cross flow of condensible vapors in the condenser casing and promotes turbulence in the flow of cooling fluid for producing high heat transfer rates between the coolant and the condensing vapor even at low coolant velocities in the tubes. Where the coolant flow is extremely low, a multi-pass construction of the condenser tubes on the tube side is available to increase the coolant velocity. The counter flow radial design of the condenser yields the greatest efficiency of operation of the cooling surfaces of the manifold pipes and tubing.

The parts for constructing the condenser are designed so there will be a minimum of welded joints so as to keep the amount of labor required for assembly of the condenser at a minimum to provide for manufacture of the condenser at a low cost.

The exterior of the column and casing for an assembled column and condenser, or condensers, is designed to give a completed assembly a design and appearance that is modern.

The condensers constructed according to the present invention as herein above described are used as stripping column steam condensers, distillation column recovery condensers, partial condensers of condensible vapors, refluxing condensers, exhaust heat recovery condensers, ejector inter and after condensers as well as for condensing all kinds of condensible vapors. The non-condensed vapors that flow outward through the tube bundle during operation of the condenser will flow around the curved baffle sections 26 and over the coldest portions of the tubes at the outer portion of the tube bundle for cooling the coldest possible temperature after which they flow outwardly through the non-condensible outlet 24 for any further treatment that may be provided or exhausted into the atmosphere. The curved baffle sections 26 may be constructed to extend about a larger portion of the tube bundle to increase or decrease the cooling of the non-condensibles at the outer portion of the tube bundle. The condenser may be constructed to operate under varying pressures including sub-atmospheric pressures in performing its cooling and condensing operation on condensible and non-condensible vapors.

The invention claimed is:

1. In a heat exchanger, the combination of a cylindrical casing provided with radially extending flanges on the lower and upper ends, a base plate mounted on the lower end of said casing, attached to the radial flange on the lower end thereof, a top plate mounted on the upper end of said casing detachably secured to the radial flange on the upper end thereof, said base plate having an inlet opening formed therein for admission of vapors into the interior of the casing, a tube bundle removably mounted in said cylindrical casing, said tube bundle having a plurality of spiral tubes mounted in adjacent relation to one another, a plurality of spacer bars mounted in transversely extending relation in said casing between adjacent tubes and retaining said tubes in spaced relation, inlet and outlet manifolds mounted in said casing and extending between said base plate and said top plate with opposite ends of said manifolds projecting through and beyond said top and base plates and detachably secured therein, said spiral condenser tubes having opposite ends formed to engage in apertures in said manifolds, means for sealing the ends of said condenser tubes in said manifolds in fluid tight relation for flow of cooling fluid through said tubes in said tube bundle from the inlet to the outlet manifold, means on the ends of said manifolds for detachably connecting pipes thereto for circulating cooling fluids to and out of said manifolds at opposite ends, said casing having an outlet connection mounted on the upper end thereof for non-condensible vapors to flow outwardly from said casing, and a condensate outlet mounted at the bottom of said casing for removal of condensed vapors from said casing.

2. A heat exchanger as claimed in claim 1, wherein a perforated plate is mounted in the tube bundle in predetermined spaced relation above the lower end of said tube bundle in transversely extending relation between a predetermined pair of adjacent condenser tubes for providing a compartment at the bottom of said casing above said base plate for accumulation of condensate, said tube bundle having the spacer bars omitted from between adjacent condenser tubes below said perforated plate, engaging one another in tangential relation between the ends thereof and cooperating in the bottom portion of said casing to provide for additional cooling of condensate therein prior to removal from said casing and condenser through said condensate outlet.

3. A heat exchanger as claimed in claim 1, wherein a pair of partially curved baffle sections are mounted in said casing to extend around a portion of the condenser tubes conforming to the shape of tube bundle about the outer end portions of said tubes in said tube bundle for providing additional cooling for vapors in said casing prior to removal of said vapors outwardly through said non-condensible vapor outlet at the top upper end of said casing.

References Cited

UNITED STATES PATENTS

| | | | |
|---|---|---|---|
| 389,900 | 9/1888 | Pratt et al. | 165—163 |
| 676,770 | 6/1901 | Rayner | 165—163 |
| 2,202,008 | 5/1940 | Ittner | 202—187 X |
| 2,941,786 | 6/1960 | Kuljian et al. | 165—110 X |
| 3,281,334 | 10/1966 | Williamson | 165—111 X |

ROBERT A. O'LEARY, *Primary Examiner.*

ALBERT W. DAVIS, *Assistant Examiner.*

U.S. Cl. X.R.

165—114; 202—189, 190